(12) United States Patent
Kniffin et al.

(10) Patent No.: US 9,500,669 B2
(45) Date of Patent: Nov. 22, 2016

(54) SYSTEM AND METHOD FOR CALIBRATING AN INERTIAL SENSOR

(71) Applicant: FREESCALE SEMICONDUCTOR, INC., Austin, TX (US)

(72) Inventors: Margaret L. Kniffin, Chandler, AZ (US); Andrew C. McNeil, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 422 days.

(21) Appl. No.: 14/155,994

(22) Filed: Jan. 15, 2014

(65) Prior Publication Data

US 2015/0198628 A1  Jul. 16, 2015

(51) Int. Cl.
*G01P 21/00* (2006.01)
*G01H 13/00* (2006.01)
*G01V 13/00* (2006.01)

(52) U.S. Cl.
CPC .............. *G01P 21/00* (2013.01); *G01H 13/00* (2013.01); *G01V 13/00* (2013.01)

(58) Field of Classification Search
None
See application file for complete search history.

(56) References Cited

U.S. PATENT DOCUMENTS

| | | |
|---|---|---|
| 2011/0167891 A1 | 7/2011 | Geen |
| 2014/0074418 A1* | 3/2014 | Lin .......................... G01P 21/00 702/96 |

* cited by examiner

*Primary Examiner* — Robert R Raevis
(74) *Attorney, Agent, or Firm* — Charlene R. Jacobsen

(57) ABSTRACT

A system (40) for calibrating an inertial sensor (20) includes a power source (42), a frequency measurement subsystem (44, 48), and a gain determination subsystem (52). A calibration process (110) using the system (40) entails applying (116) a bias voltage (66) to the inertial sensor (20), measuring (114) a drive resonant frequency (46), and measuring (118) a sense resonant frequency (50) of the inertial sensor (20) produced in response to the bias voltage (66). A gain value (32) is determined (124) for calibrating (144) the inertial sensor (20) using a relationship (140) between the sense resonant frequency (50) and the bias voltage (66) without imposing an inertial stimulus on the inertial sensor (20).

20 Claims, 5 Drawing Sheets

SYSTEM AND METHOD FOR CALIBRATING AN INERTIAL SENSOR

TECHNICAL FIELD OF THE INVENTION

The present invention relates generally to calibrating inertial sensors. More specifically, the present invention relates to calibrating an inertial sensor without subjecting the sensor to an inertial stimulus.

BACKGROUND OF THE INVENTION

Microelectromechanical Systems (MEMS) inertial sensors are widely used in applications such as automotive, inertial guidance systems, household appliances, game devices, cellular telephony, protection systems for a variety of devices, and many other industrial, scientific, and engineering systems. Such MEMS sensors are used to sense a physical condition such as acceleration, angular rate, pressure, or temperature, and to provide an electrical signal representative of the sensed physical condition.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

DETAILED DESCRIPTION

Capacitive-sensing microelectromechanical systems (MEMS) inertial sensor designs, such as accelerometers, angular rate sensors, and so forth, are highly desirable for operation in a wide variety of environments and in miniaturized devices, and due to their relatively low cost. Capacitive inertial sensors sense a change in electrical capacitance, with respect to an inertial stimulus, such as acceleration or angular rate, to vary the output of an energized circuit. The integrated circuit of a MEMS inertial sensor may be calibrated at the factory for sensitivity and offset level. Factory calibrated MEMS inertial sensors can reduce or eliminate the need for end-user calibration. However, accurate calibration of MEMS inertial sensors is critical for achieving reliable output signals.

Traditionally, factory calibration of MEMS sensors is performed using a mechanical platform that precisely moves the MEMS inertial sensors in controlled orientations, and at known accelerations and/or rotational velocities. The output of the inertial sensors are observed and compared with design parameters for the inertial sensors. The MEMS inertial sensors can then be calibrated or trimmed to match the design parameters. The calibration parameters, also referred to as gain values, trim values, or calibration values, can be stored inside the MEMS inertial sensor. Thus, the calibration parameters may be employed any time the device is turned on. Unfortunately, the cost of a mechanical platform and associated calibration procedure can be cost and time prohibitive. Furthermore, there is limited parallelism (i.e., how many MEMS devices can be tested at the same time) for systems that require physical stimulus.

Embodiments entail a calibration system and a method for calibrating an inertial sensor, especially for calibrating a gyroscope. The system and methodology uses a relationship between a sense resonant frequency of the inertial sensor and a bias voltage applied to the inertial sensor to provide information for setting a gain value for the inertial sensor. Accordingly, a sensitivity of the inertial sensor can be calibrated, or trimmed, utilizing standard semiconductor test tools without subjecting the inertial sensor to an inertial stimulus.

Figure 1:
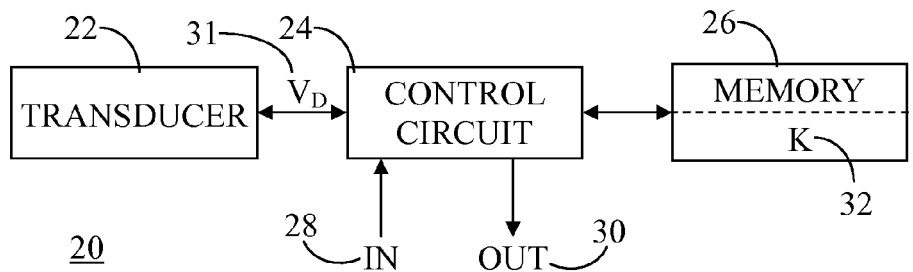
FIG. 1 shows a schematic diagram conceptually showing relevant components of a microelectromechanical systems (MEMS) inertial sensor.

FIG. 1 shows a schematic diagram conceptually showing relevant components of a microelectromechanical systems (MEMS) inertial sensor 20. MEMS inertial sensor 20 may include a transducer 22, a control circuit 24 coupled to MEMS structure 22, and a memory 26 coupled to controller 24. MEMS inertial sensor 20 may include other components not shown herein for simplicity of illustration. Inertial sensor 20 may be an acceleration sensor, an angular rate sensor, pressure sensor, and the like that is configured to detect an inertial, or physical, stimulus and convert it to an output signal in the form of, for example, a voltage.

Generally, transducer 22 is a device that converts an input signal, e.g., acceleration, angular rate, and so forth, into another form of energy, e.g., voltage. Transducer 22 typically includes various types of drive and/or sense structures including at least one mechanical moving part (referred to hereinafter for convenience as a "movable mass") adjacent to fixed sensing structures (referred to hereinafter as sense electrodes). Movement of the movable mass or masses is detected by low level signals induced in the sense electrodes due to changes in capacitance between the moving parts and the fixed sense electrodes.

Control circuit 24 may be any active or passive circuitry used to communicate signals to and from the various moving parts of transducer 22, e.g., for driving and/or sensing movement of the movable mass(es). Control circuit 24 may receive various input signals 28 (e.g., power signals from a power supply, temperature signals from the temperature sensor) and may provide various output signals 30 (e.g., output signals representing movement of MEMS inertial sensor 20). In an exemplary configuration, control circuit 24 may provide an electrostatic driving force, referred to herein as a drive signal 31, $V_D$, to transducer 22 to activate, or otherwise set, one or more movable masses of transducer 22 into oscillatory motion. Control circuit 24 may also obtain various types of operating parameters from memory 26. Exemplary operating parameters may include one or more gain values 32, labeled K in FIG. 1. Gain value 32 may be used to adjust the sensitivity of MEMS inertial sensor 20 from an actual sensitivity (also referred to as native sensitivity) to a predetermined design sensitivity when the sensed signals are converted to device output signals 30.

Figure 2:
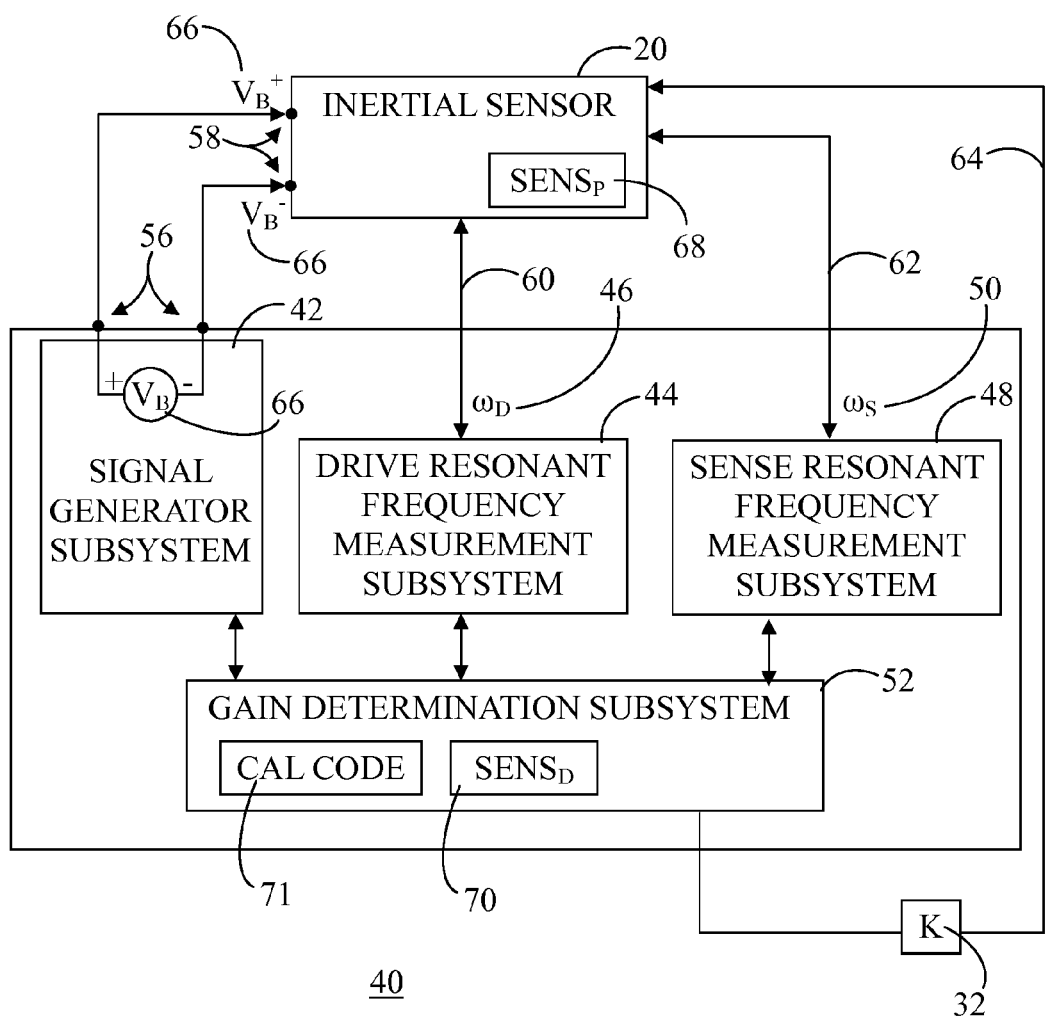
FIG. 2 shows a block diagram of a calibration system used to calibrate an inertial sensor in accordance with an embodiment.

FIG. 2 shows a block diagram of a calibration system 40 used to calibrate inertial sensor 20 in accordance with an embodiment. In general, calibration system 40 includes a signal generator subsystem 42, a drive resonant frequency measurement subsystem 44 for measuring a drive resonant frequency 46 of MEMS device 20, and a sense resonant frequency subsystem 48 for measuring a sense resonant frequency 50 of MEMS device 20. Calibration system 40 further includes a gain determination subsystem 52 for determining gain value 32 (FIG. 1) based at least in part on a relationship between a bias voltage applied to inertial sensor 20 via signal generator subsystem 42 and sense resonant frequency 50. Gain determination subsystem 52 may output gain value 32 to MEMS inertial sensor 20 for storage at, for example, memory 26 (FIG. 1).

In a calibration configuration, output elements 56 of calibration system 40 are coupled between signal generator subsystem 42 and inputs 58 of inertial sensor 20. Additionally, a conductive connection 60 may be formed between inertial sensor 20 and drive resonant frequency measurement subsystem 44 and another conductive connection 62 may be formed between inertial sensor 20 and sense resonant frequency measurement subsystem 48.

Additionally, a conductive connection 64 may be coupled between gain determination subsystem 52 and inertial sensor 20. Physical wiring and/or wireless communication may be implemented to provide the various connections between inertial sensor 20 and calibration system 40.

Signal generator subsystem 42 produces an electrical signal, referred to herein as a bias voltage 66, and labeled $V_B^+$ and $V_B^-$ in FIG. 2. In an embodiment, bias voltage 66 is a direct current (DC) bias voltage that may be applied to transducer 22 (FIG. 1) of MEMS inertial sensor 20 via outputs 56 where it is subsequently input into inertial sensor 20 at inputs 58. More particularly, bias voltage 66 is suitably communicated to transducer 22 via control circuit 24 (FIG. 1). As will be discussed in greater detail below, bias voltage 66 is applied to transducer 22 in lieu of an inertial stimulus in order to calibrate inertial sensor 20. Sense resonant frequency 50 is produced in response to the application of bias voltage 66 and is received at sense resonant frequency measurement subsystem 48 via conductive connection 62. A relationship between bias voltage 66 and sense resonant frequency 50 can be utilized to calibrate inertial sensor 20.

Calibration system 40 may be external to inertial sensor 20, integrated into inertial sensor 20, or some combination of external and internal integration. Calibration system 40 and its elements are shown in block diagram form for simplicity of illustration. However, those skilled in the art of test equipment will understand that a calibration system containing at least a signal generator and various processing elements will include multiple passive and active circuits, connectors, cabling, controls, and the like. Furthermore, some components may share certain circuitry, e.g., the two frequency measurement subsystems may share a common frequency counter. Calibration system 40 and calibration methodology will be discussed in connection with the calibration of a single inertial sensor 20 for simplicity of discussion. However, in actual practice, calibration system 40 may be configured to concurrently calibrate multiple inertial sensors 20.

Inertial sensor 20 is designed to have a particular sensitivity to a physical stimulus, referred to herein as a design sensitivity, i.e. $SENS_D$. The sensitivity of an electronic device, such as inertial sensor 20 is the minimum magnitude of input signal required to produce a specific output signal having a specified signal-to-noise ratio, or other specified criteria. In actual practice, the "actual" or "true" sensitivity of inertial sensor 20 to a physical stimulus may differ from the design sensitivity due to physical variations in the actual structure of inertial sensor 20. These physical variations are referred to herein as process parameters because they typically occur during the manufacturing, i.e., the processing, operations that yield inertial sensor 20. Some process parameters include, for example, the gap width (laterally or vertically) between the fixed and movable drive and sense electrodes, MEMS device layer thickness, polysilicon density (mass), and so forth.

Calibration of inertial sensor 20 is performed to account for the variability of the actual (or native) sensitivity 68, generally represented by $SENS_P$ in FIG. 2, of inertial sensor 20 to a physical stimulus, from a design sensitivity 70, generally represented by $SENS_D$ in FIG. 2. Sensitivity 68, $SENS_P$, is adjusted during calibration to match design sensitivity 70, $SENS_D$. In other words, each inertial sensor 20 is calibrated so that its particular sensitivity 68, $SENS_P$, matches design sensitivity 70, $SENS_D$.

Accordingly, gain determination subsystem 52 can include computer readable media (e.g., a memory, firmware, etc.) associated therewith storing executable code 71, labeled CAL CODE. Executable code 71 instructs gain determination subsystem 52 to establish a relationship between a plurality of voltage levels of bias voltage 66 and the resulting sense resonant frequency 50 at each voltage level, ascertain sensitivity 68, $SENS_P$, from this relationship, and compute gain value 32 (FIG. 1) as a function of sensitivity 68 and design sensitivity 70, $SENS_D$. Gain value 32 can be communicated to inertial sensor 20 via conductive connection 64 to be stored at inertial sensor 20, so that its sensitivity 68, $SENS_P$, matches design sensitivity 70, $SENS_D$.

Figure 3:
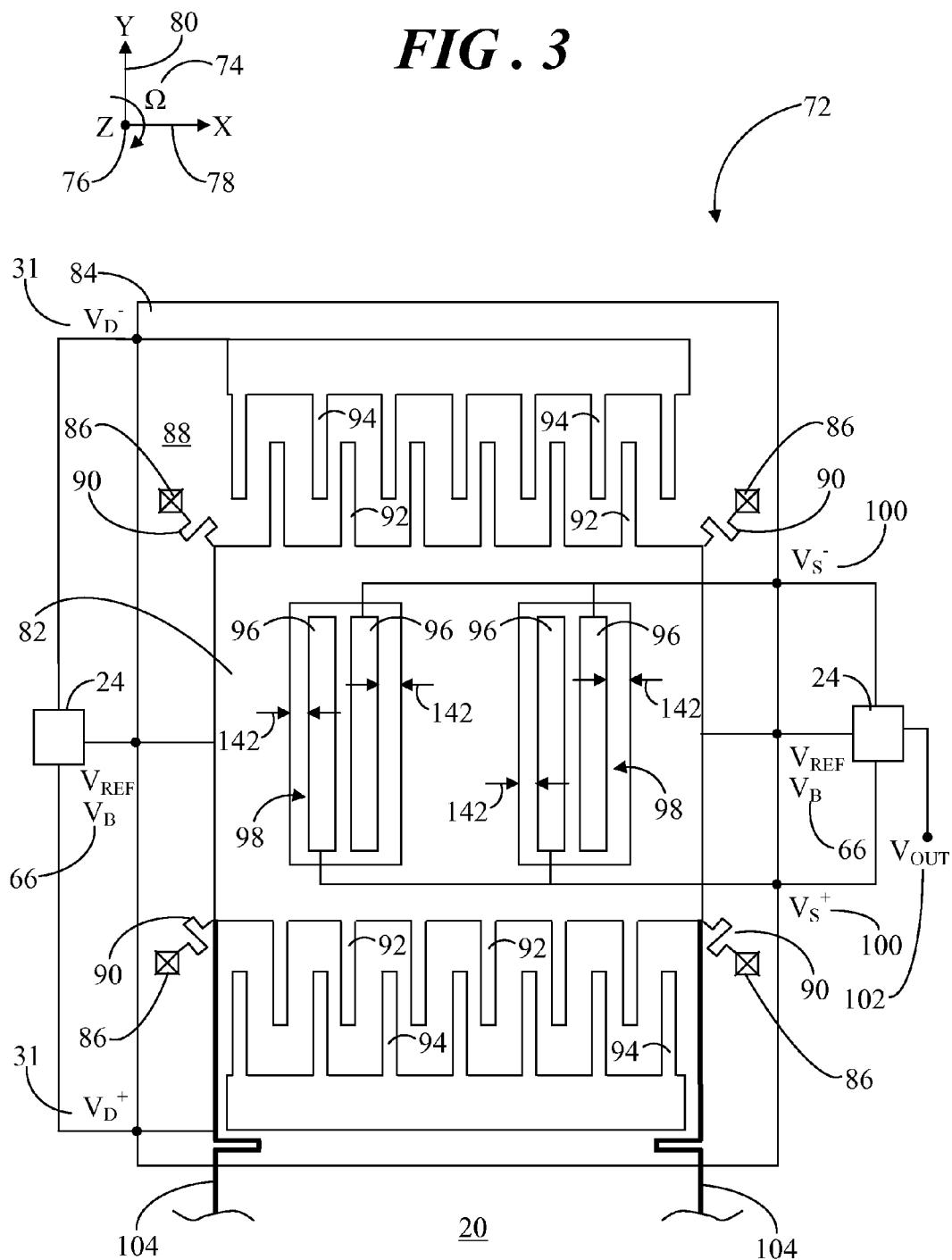
FIG. 3 shows a top view of a portion of an inertial sensor to be calibrated in accordance with an embodiment.
Figure 4:
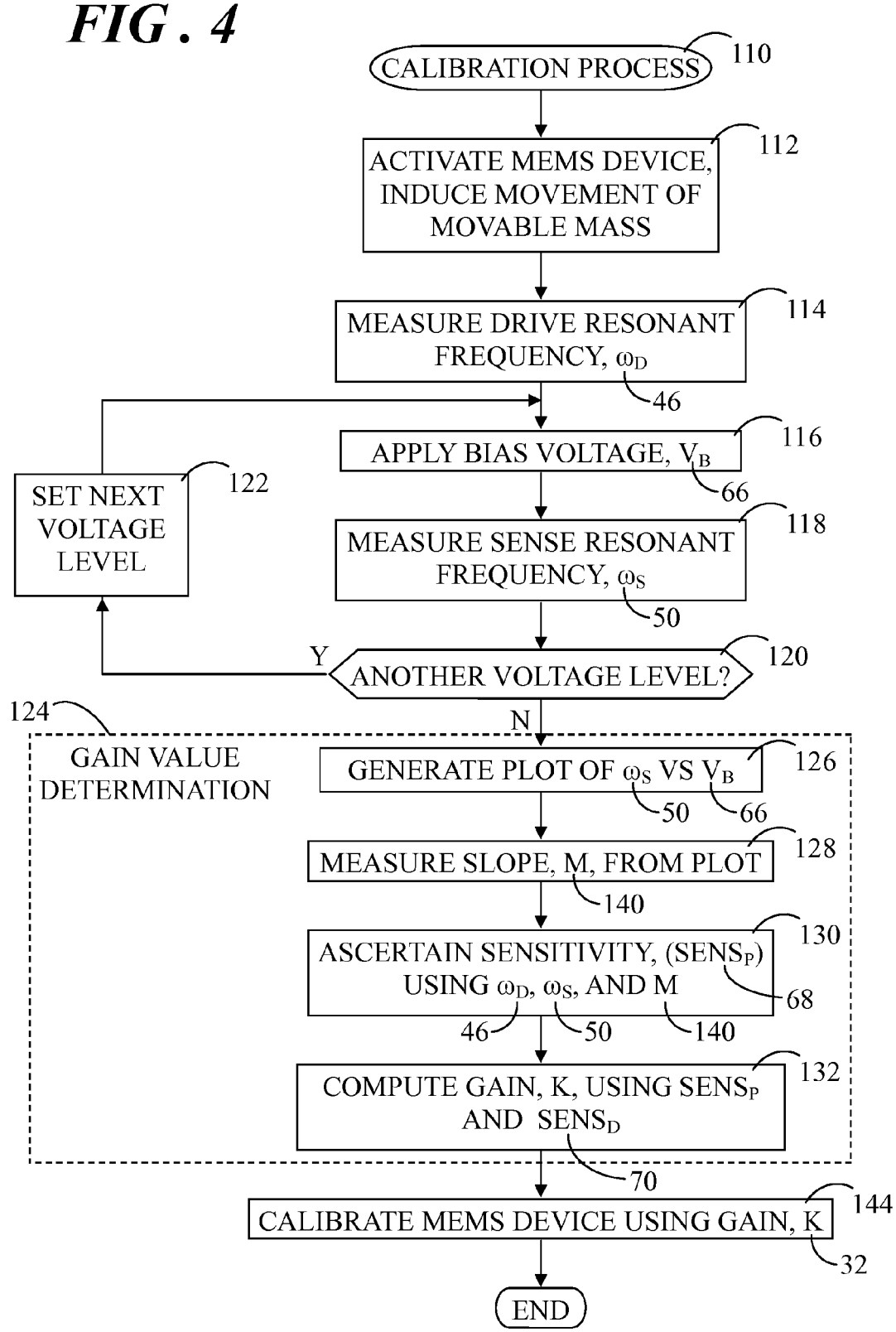
FIG. 4 shows a flowchart of a calibration process performed using the calibration system.

FIG. 3 shows a top view of an exemplary portion of MEMS inertial sensor 20 to be calibrated in accordance with a subsequent discussion of the operations of a calibration process presented in FIG. 4. In this example, transducer 22 (FIG. 1) of MEMS inertial sensor 20 includes a gyroscope 72, sometimes referred to as an angular rate sensor, which is adapted to sense angular velocity 74, represented by a curved arrow and labeled Ω in FIG. 3, about a Z-axis 76 in a three-dimensional coordinate system. Accordingly, Z-axis 76 may be referred to as the input axis in connection with this example. In this illustration, Z-axis 76 is normal to the plane of the page, an X-axis 78 is directed right-to-left on the page, and a Y-axis 80 is directed up-and-down on the page. Accordingly, inertial sensor 20 (FIG. 1) is exemplified by gyroscope 72.

Gyroscope 72 includes a movable mass 82 suspended above an underlying substrate 84. Suspension anchors 86 are formed on a planar surface 88 of substrate 84 and compliant members 90 interconnect movable mass 82 with suspension anchors 86. Movable drive fingers 92 are oriented approximately parallel to Y-axis 80 and extend from perimeter edges of movable mass 82. Fixed drive fingers 94 are attached to substrate 84 and are in alternating arrangement with movable drive fingers 92. Gyroscope 72 further includes fixed sense fingers 96 positioned in openings 98 extending through movable mass 82 and attached to substrate 84.

In a structure of this type, movable mass 82 is driven into oscillation via drive signal 31 provided by control circuit 24 (FIG. 1). In the illustrated embodiment, movable mass 82 will oscillate in response to drive signal 31 in a direction substantially parallel to Y-axis 80. As such, Y-axis 80 may be referred to as the drive axis in connection with this example. When gyroscope 72 is subjected to angular velocity 74 about the input axis, i.e., Z-axis 76, Coriolis acceleration is generated on the oscillating movable mass 82 in a direction orthogonal to both the drive direction and the rotation. In this example, Coriolis acceleration is generated along X-axis 78. Therefore, X-axis 78 may be referred to as the sense axis in connection with this example. As such, gyroscope 72 represents a Z-axis gyroscope with lateral drive and lateral sense capability.

The magnitude of the Coriolis acceleration is proportional to both the velocity of the oscillating movable mass 82 and angular velocity 74. The resulting Coriolis acceleration can be measured by sensing deflections of movable mass 82 substantially parallel to X-axis 78. When movable mass 82 moves along the sense axis, e.g., X-axis 78, capacitances between fixed sense fingers 96 and movable mass 82 change. The capacitive changes are represented by an analog output voltage 100, labeled $V_S^+$ and $V_S^-$ in FIG. 3. Control circuit 24 (FIG. 1) converts analog output voltage 100 to a calibrated output signal 102, labeled $V_{OUT}$ in FIG. 3, representative of angular velocity 74 about Z-axis 76.

A simplified capacitive Z-axis gyroscope 72 with lateral (i.e., in-plane) sensing having a single movable mass 82 is shown for illustrative purposes. It should be understood that a wide variety of structures may be conceived having differing sizes and shapes, multiple movable masses, differing numbers of fixed and sense fingers, an out-of-plane sensing axis, and the like. By way of example, gyroscope 72 is shown as having a pair of springs 104. Springs 104 may interconnect movable mass 82 with another movable mass 82 (not shown for simplicity of illustration). The pair of movable masses 82 may be driven in phase opposition for rejecting signal error as known to those skilled in the art. In addition, although a gyroscope is described herein, the calibration methodology (discussed below) may be adapted to calibrate other inertial sensors such as, for example, accelerometers.

Referring to FIG. 4 in connection with FIG. 3, FIG. 4 shows a flowchart of a calibration process 110 performed using calibration system 40 to calibrate inertial sensor 20. Calibration process 110 may be performed when inertial sensor 20 is connected to calibration system 20 and CAL CODE 71 (FIG. 2) is executed. Calibration process 110 determines gain value 32 (FIG. 1) so that sensitivity 68, $SENS_P$ (FIG. 2), can be calibrated, or trimmed, without subjecting inertial sensor 20 (FIG. 1) to an inertial stimulus, i.e., mechanical movement. In this discussion, inertial sensor 20 includes gyroscope 72. Accordingly, calibration process 110 will be discussed in connection with calibrating gyroscope 72 presented in FIG. 3.

Calibration process 110 begins with a task 112. At task 112, gyroscope 72, which is connected to calibration system 40, is activated. That is, when calibration process 110 is executed to calibrate gyroscope 72, the one or more movable masses of gyroscope 72 are set into motion. In general, an alternating current voltage (AC) voltage, e.g., drive signal 31 (FIG. 1) may be applied to fixed drive fingers 94 via control circuit 24 to induce oscillatory movement of movable mass(s) 82 along Y-axis 80 at drive frequency 46 (FIG. 2).

In response to task 112, calibration process 110 continues with a task 114. At task 114, drive frequency 46, $\Omega_D$, is measured via drive resonant frequency measurement subsystem 44 (FIG. 2) of calibration system 40. Drive frequency 46 may be measured on chip using standard semiconductor test tools.

Calibration process 110 continues with a task 116. At task 116, bias voltage 66, $V_B$, at a first voltage level is applied to gyroscope 72. In an embodiment, bias voltage 66 is a direct current (DC) bias voltage at a voltage level within a predetermined range of voltages, for example, within 4-7 VDC. Bias voltage 66 may be provided by signal generator subsystem 42 (FIG. 2) of calibration system 40 and communicated to gyroscope 72 via control circuit 24.

In general, bias voltage 66, $V_B$, is applied to modify the potential difference between sense mass 82 and fixed sense fingers 96. Bias voltage 66 can be expressed as follows:

$$V_{B+} = V_{S+} - V_{REF} \tag{1}$$

$$V_{B-} = V_{S-} - V_{REF}, \text{ where ideally } V_{B+} = V_{B-} \tag{2}$$

Accordingly, in order to modify the potential difference between sense mass 82 and fixed sense fingers 96, bias voltage 66, $V_B$, may be applied by changing the DC voltage level of the reference voltage, $V_{REF}$. This changed DC voltage level results in a voltage difference between sense mass 82 and fixed sense fingers 96, and this voltage difference is referred to herein as bias voltage 66. Bias voltage is represented in FIG. 3 by associating bias voltage 66, $V_B$, in proximity to the reference voltage, $V_{REF}$. In alternative configurations, the DC voltage level of $V_{S+}/V_{S-}$ may be modified in order to modify the potential difference, i.e., apply bias voltage 66, between sense mass 82 and fixed sense fingers 96.

A task 118 is performed in connection with task 116. At task 118, sense resonant frequency 50, $\omega_S$, is measured via sense resonant frequency measurement subsystem 48 (FIG. 2) of calibration system 40 in response to the application of bias voltage 66. Sense resonant frequency 50 may be measured via probe (not shown). However, other techniques may alternatively be available for measuring sense resonant frequency 50 such as ring down testing, mixing, and/or continuous drive. Sense resonant frequency 50 may be measured as a sinusoidally varying capacitance between fixed sense electrodes 96 and movable mass 82. This sinusoidally varying capacitance is produced in response to bias voltage 66 and drive signal 31, which induces oscillatory movement of movable mass 82 along X-axis 78 at sense resonant frequency 50.

Calibration process 110 continues with a query task 120. At query task 120, a determination is made as to whether bias voltage 66 is to be applied to gyroscope 72 at another voltage level. When bias voltage 66 at another voltage level is to be applied, program control proceeds to a task 122. At task 122, the next voltage level is set at signal generator subsystem 42 (FIG. 1). Program control then loops back to task 116 to apply bias voltage 66 and to task 118 to again measure sense resonant frequency 50. Accordingly, through the iterative execution of tasks 116, 118, 120, and 122, a relationship can be established between a plurality of voltage levels of bias voltage 66 and the resulting values of sense resonant frequency 50 at each voltage level. In accordance with an embodiment, this relationship is exploited to calibrate inertial sensor 20 that includes transducer 72. When a determination is made at query task 120 that there is not another voltage level of bias voltage 66 to be applied, calibration process 110 continues with a task 124.

At task 124, gain value 32 (FIG. 2) is determined using the relationship between bias voltage 66, $V_B$, and sense resonant frequency 50, $\omega_S$. Task 124 encompasses a grouping of subtasks 126, 128, 130, and 132 that are distinguished in FIG. 4 by a dashed line box and are individually described for clarity of understanding.

In order to determine gain 32, subtask 126 is performed to generate a plot of sense resonant frequency 50, $\omega_S$, versus bias voltage 66, $V_B$, in order to establish a relationship between them.

Figure 5:
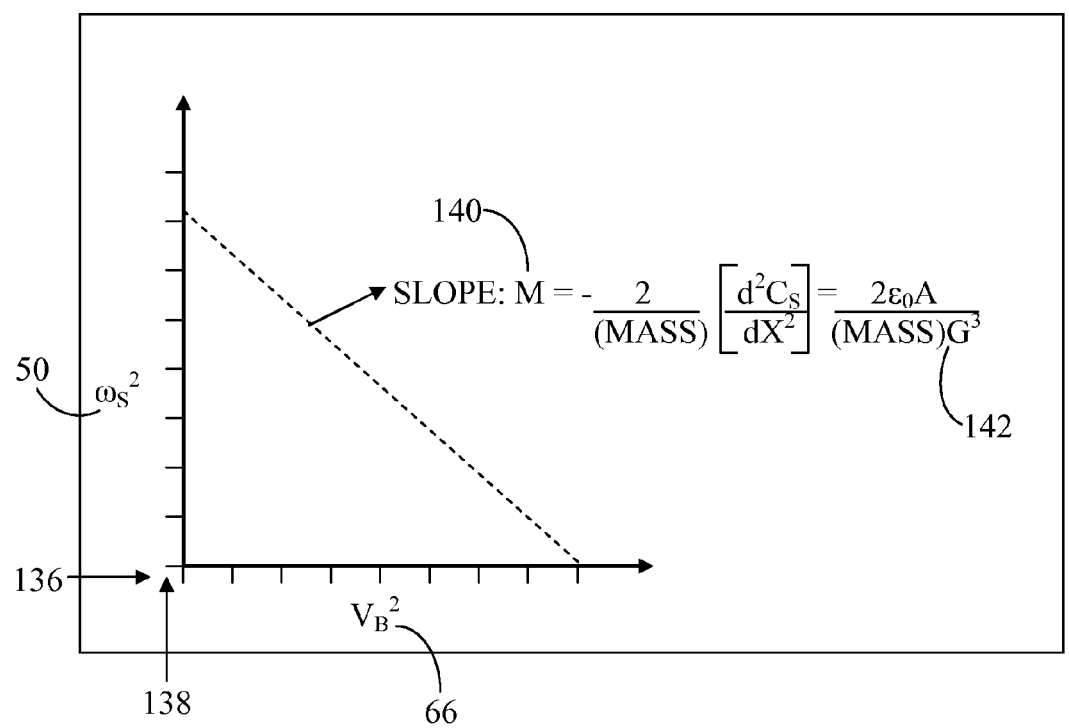
FIG. 5 shows a graph of the relationship between variables generated in accordance with the calibration process of FIG. 4.

Referring to FIG. 5 in connection with subtask 126, FIG. 5 shows a plot 134 of the relationship between variables generated in accordance with calibration process 40. More particularly, the relationship between a plurality of voltage levels 136 of bias voltage 66 (i.e., the voltage potential difference between movable mass 82 and fixed sense fingers 96) and the resulting resonant frequency values 138 of sense resonant frequency 50 at a voltage level 136 is shown in plot 134. Plot 134 presents this relationship as the square of sense resonant frequency 50 versus the square of bias voltage 66. In general, applying bias voltage 66 between movable mass 82 and fixed sense fingers 96 creates electrostatic spring softening in which springs 90 become less stiff in response to the applied electrostatic force. The apparent spring constant will appear to be lower in response to a higher applied bias voltage. That is, a high voltage level 136 of bias voltage 66 yields a lower resonant frequency value 138 of sense resonant frequency 50. This effect is demonstrated in plot 134.

With continued reference to FIGS. 4 and 5, at subtask 128, a slope 140, M, is measured from plot 134. Next, sensitivity 68, $SENS_P$, can be ascertained at subtask 130 using drive resonant frequency 46, $\omega_D$, sense resonant frequency 50, $\omega_S$, and slope 140, M.

Slope 140 is a function of the mass (MASS) of movable mass 82, a change in the sense capacitance, and the change in a width of a sense gap 142 (see FIG. 4), g, between fixed sense electrodes 96 and movable mass 82, as follows:

$$M = -\frac{2}{MASS}\left[\frac{\partial^2 C_S}{\partial X^2}\right] \quad (3)$$

The z-axis sensitivity 68, $SENS_P$, for gyroscope 72 (FIG. 3) can be expressed as follows:

$$SENS_P = \frac{V_{OUT}}{\Omega} \quad (4)$$

Additionally, the response of an open loop lateral drive and lateral sense gyroscope, such as gyroscope 72, can be given by the following expression:

$$V_{OUT} = \frac{\Delta C_S}{C_{REF-S}} \quad (5)$$

$$= 4\Omega \frac{C_{REF-D}}{C_{REF-S}} V_{AGC} \frac{\left[\frac{\partial C_S}{\partial X}\right]}{\left[\frac{\partial C_D}{\partial Y}\right]} \frac{\omega_D}{(\omega_S^2 - \omega_D^2)} \quad (6)$$

where $V_{OUT}$ is output signal 102 (FIG. 3) of inertial sensor 20, $V_S$ is analog output voltage 100 (FIG. 3) produced at transducer 72, $\Omega$ is angular velocity 74, and $V_{AGC}$ is a target voltage. $C_{REF-D}/C_{REF-S}$ should be relatively independent of manufacturing variation. Accordingly, what remains is to determine the ratio of the drive motion to capacitance transfer function ($\partial C_D/\partial Y$) and the sense motion to capacitance transfer function ($\partial C_S/\partial X$) from the static electrical test so that manufacturing variations in these values can be trimmed without rotating gyroscope 72. Derivation of the equation for slope 140, M, the drive motion to capacitance transfer function ($\partial C_D/\partial Y$), and the sense motion to capacitance transfer function ($\partial C_S/\partial X$) are as follows:

For drive electrodes 92/94, drive capacitance, $C_D$, can be expressed as follows:

$$C_D = \frac{2 \cdot nf \cdot Lf \cdot t_{si} \cdot \varepsilon_0}{g} \quad (7)$$

The drive motion to capacitance transfer function ($\partial C_D/\partial Y$) can be expressed as follows:

$$\frac{\partial C_D}{\partial Y} = \frac{2 \cdot nf \cdot t_{si} \cdot \varepsilon_0}{g} \quad (8)$$

and:

$$\frac{\partial^2 C_D}{\partial Y^2} = 0 \quad (9)$$

For sense electrodes 96, sense capacitance, $C_S$, can be expressed as follows:

$$C_S = \frac{nfs \cdot Lfs \cdot t_{si} \cdot \varepsilon_0}{g} \quad (10)$$

The sense motion to capacitance transfer function ($\partial C_S/\partial X$) can be expressed as follows:

$$\frac{\partial C_S}{\partial X} = \frac{nfs \cdot Lfs \cdot t_{si} \cdot \varepsilon_0}{g^2} \quad (11)$$

and:

$$\frac{\partial^2 C_S}{\partial X^2} = \frac{2 \cdot nfs \cdot Lfs \cdot t_{si} \cdot \varepsilon_0}{g^3} \quad (12)$$

Sense resonant frequency 50, $\omega_S$, as a function of bias voltage 66 can be expressed as follows:

$$\omega_S^2(V_B) = \omega_{S0}^2 - \frac{2}{MASS} \frac{\partial^2 C_S}{\partial X^2} V_B^2 \quad (13)$$

where $\omega_{S0}^2$ is at the Y-intercept in plot 134 (i.e., bias voltage 66 is zero), thus indicating pure mechanical resonant frequency. Equation (1) for slope 140, M, can be derived from equation (11) as follows:

$$M = \frac{\omega_S^2}{V_B^2} = -\frac{2}{MASS} \frac{\partial^2 C_S}{\partial X^2} \quad (14)$$

if:

$$MASS = m_o \frac{t_{si}}{t_o} \quad (15)$$

and $$-\frac{\partial^2 C_S}{\partial Y^2} = \frac{nf \cdot Wf \cdot C \cdot t_o \cdot \varepsilon_0}{g^3} \quad (16)$$

then equation (1) for slope 140, M, can be presented as follows:

$$M = \frac{t_o}{t_{si} m_o} \cdot \frac{nf \cdot Wf \cdot t_{si} \cdot \varepsilon_0}{g^3} = \frac{\alpha}{g^3} \quad (17)$$

Note the strong dependence of slope 140, M, on the width of sense gap 142 (see FIG. 3), g, which is a process parameter that can vary during manufacturing and can therefore affect sensitivity 68 (FIG. 2) of MEMS inertial sensor 20. Solving for the width of sense gap 142, g, yields:

$$g = \sqrt[3]{\alpha M} \quad (18)$$

The ratio of the drive motion to capacitance transfer function ($\partial C_D/\partial Y$) and the sense motion to capacitance transfer function ($\partial C_S/\partial X$) may be expressed as follows:

$$\gamma = \frac{\left[\frac{\partial C_S}{\partial X}\right]}{\left[\frac{\partial C_D}{\partial Y}\right]} \quad (19)$$

where $$\left[\frac{\partial C_D}{\partial Y}\right] = \frac{nfdrive \cdot Wf \cdot t_{si} \cdot \varepsilon_0}{g} \quad (20)$$

and $$\left[\frac{\partial C_S}{\partial X}\right] = \frac{nf \cdot Wf \cdot t_{si} \cdot \varepsilon_0}{g^2} \quad (21)$$

Substituting equations (18) and (19) into equation (17) to solve for ratio, γ, yields:

$$\gamma = \frac{nf \cdot Wf}{nfdrive} \frac{1}{g} = \beta \frac{1}{\sqrt[3]{\alpha M}} = \beta' \frac{1}{\sqrt[3]{M}} \quad (22)$$

where β' is a function of nominal design. Utilizing equations (2) and (3) to solve for sensitivity 68, $SENS_P$, yields the following:

$$SENS_P = \frac{V_{OUT}}{\Omega} \quad (23)$$

$$= 4\left[\frac{C_{REF-D}}{C_{REF-S}}\right] V_{AGC} \frac{\left[\frac{\partial C_S}{\partial X}\right]}{\left[\frac{\partial C_D}{\partial Y}\right]} \frac{\omega_D}{(\omega_S^2 - \omega_D^2)}$$

$$= 4\frac{C_{REF-D}}{C_{REF-S}} V_{AGC} \frac{\omega_D}{(\omega_S^2 - \omega_D^2)} \frac{\beta'}{\sqrt[3]{M}}$$

$V_{AGC}$, β', and $C_{REF-D}/C_{REF-S}$ are design parameters and are thus largely insensitive to process variation. Drive resonant frequency 46, $\omega_D$, sense resonant frequency 50, $\omega_S$, and slope 140, M, are measured values. Accordingly, sensitivity 68, $SENS_P$, can be ascertained using the measured values of drive resonant frequency 46, sense resonant frequency 50 and slope 140 in accordance with equation (21) and the known design parameters.

Following subtask 130 of gain determination task 124, calibration process 60 continues with subtask 132. At subtask 132, sensitivity 68, $SENS_P$, ascertained from subtask 130 is utilized to compute gain value 32, K, for gyroscope 72. That is, now that $SENS_P$ 68 is known, gain value 32 can be found so that $SENS_P$ 68, adjusted by gain value 32, largely matches design sensitivity 70 (FIG. 2), $SENS_D$ for gyroscope 72. For example, $SENS_P*K = SENS_D$. Therefore, $K = SENS_D/SENS_P$.

Next, at a task 144, gain value 32 is communicated from calibration system 40 (FIG. 2) to inertial sensor 20 (FIG. 1) that includes gyroscope 72 via conductive connection 64 (FIG. 2). As such, a capacitance to voltage transfer function, can be suitably adjusted using gain value 32 so that the sensitivity 68, $SENS_P$, matches design sensitivity 70, $SENS_D$ for gyroscope 72. Calibration process 60 ends following task 144.

Figure 6:
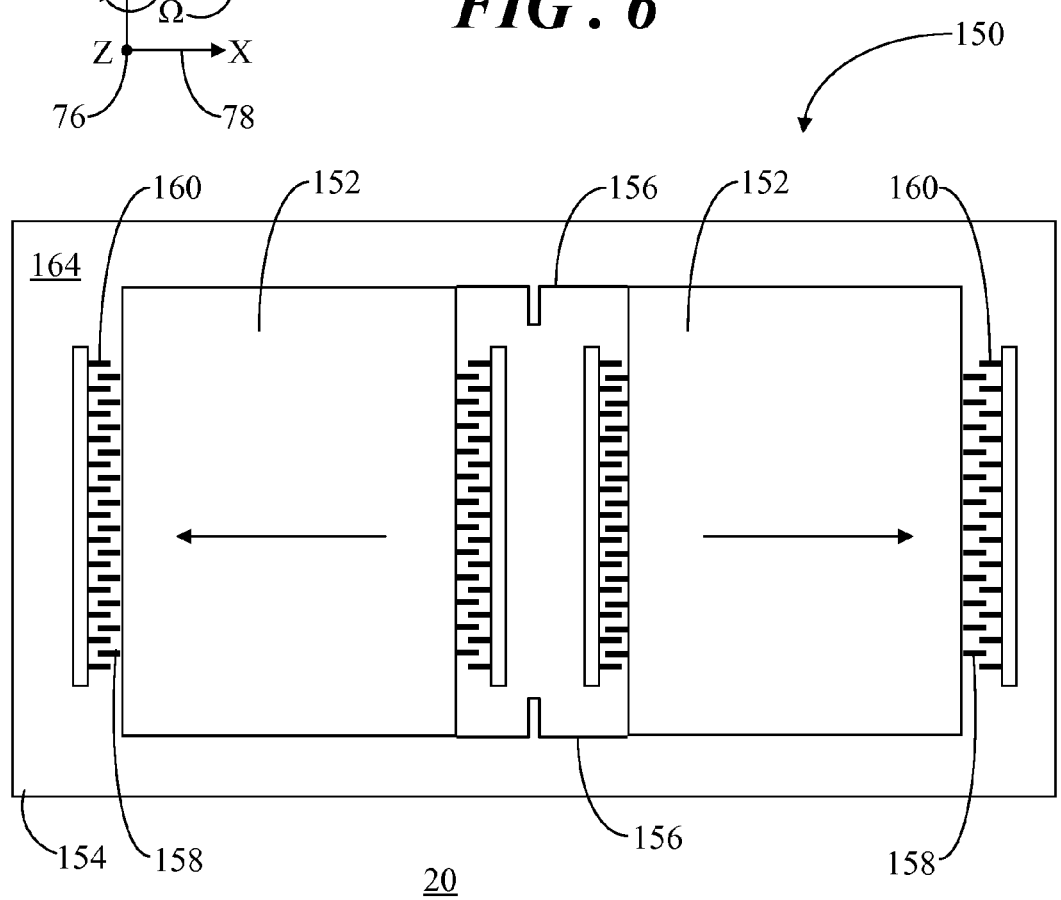
FIG. 6 shows a top view of another inertial sensor that may be calibrated in accordance with the calibration process.
Figure 7:
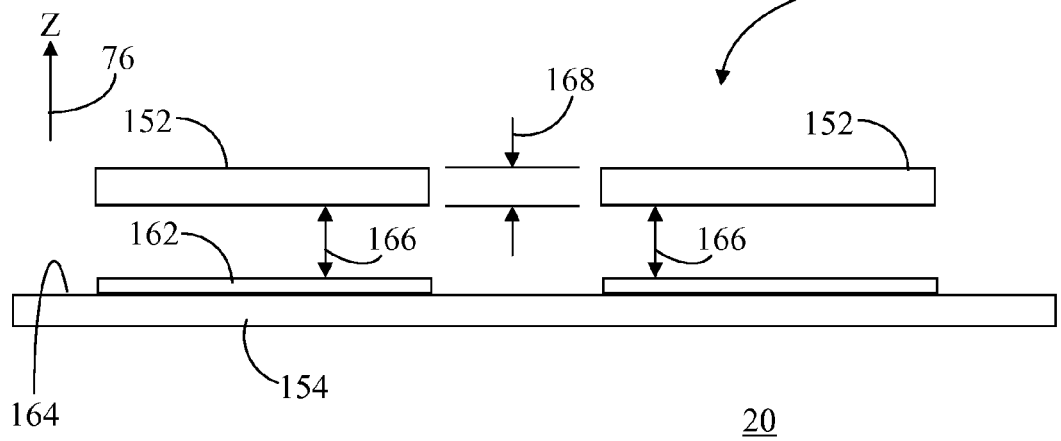
FIG. 7 shows a side view of the inertial sensor of FIG. 6.

Referring to FIGS. 6-7, FIG. 6 shows a top view of another exemplary portion of MEMS inertial sensor 20 that may be calibrated in accordance with calibration process 110 (FIG. 4), and FIG. 7 shows a side view of the inertial sensor of FIG. 6. In this example, transducer 22 (FIG. 1) of MEMS inertial sensor 20 includes a vertically sensing gyroscope 150, sometimes referred to as an angular rate sensor. Gyroscope 150 is adapted to sense angular velocity 74, represented by a curved arrow and labeled Ω in FIG. 3, about Y-axis 80 in a three-dimensional coordinate system. Accordingly, Y-axis 80 may be referred to as the input axis in connection with this example. Like FIG. 3, in this illustration, Z-axis 76 is normal to the plane of the page, an X-axis 78 is directed right-to-left on the page, and a Y-axis 80 is directed up-and-down on the page.

Gyroscope 150 includes a movable masses 152 suspended above an underlying substrate 154. Movable masses 152 are interconnected via a pair of drive springs 156 that enable their oscillation in phase opposition. Gyroscope 150 further includes movable drive fingers 158 that are oriented approximately parallel to X-axis 78 and extend from perimeter edges of movable masses 152. Fixed drive fingers 160 are attached to substrate 154 and are in alternating arrangement with movable drive fingers 158. Gyroscope 150 further includes fixed sense electrodes 162 formed on substrate 154 and underlying each of movable masses 154. Suspension anchors and compliant members that interconnect movable masses 152 with substrate 154 are not illustrated herein for clarity of illustration.

In a structure of this type, movable masses 152 are driven into oscillation via drive signal 31 provided by control circuit 24 (FIG. 1). In the illustrated embodiment, movable masses 152 will oscillate in response to drive signal 31 in a direction substantially parallel to X-axis 78. As such, X-axis 78 may be referred to as the drive axis in connection with this example. When gyroscope 150 is subjected to angular velocity 74 about the input axis, i.e., Y-axis 80, Coriolis acceleration is generated on the oscillating movable masses 152 in a direction orthogonal to both the drive direction and the rotation. In this example, Coriolis acceleration is generated along Z-axis 76. Therefore, Z-axis 76 may be referred to as the sense axis in connection with this example. As such, gyroscope 150 represents a lateral drive, vertical sensing configuration.

The magnitude of the Coriolis acceleration is proportional to both the velocity of the oscillating movable masses 152 and angular velocity 74. The resulting Coriolis acceleration can be measured by sensing out-of-plane deflections of movable masses 152. The out-of-plane movement is illustrated in the side view of movable masses 152 in FIG. 7. When movable masses 154 move out-of-plane along the sense axis perpendicular to a planar surface 164 of substrate 154, e.g., Z-axis 76, capacitances between fixed sense electrodes 162 and movable masses 152 change. The capacitive changes can be represented by the analog output voltage, $V_s$, as used previously, and control circuit 24 (FIG. 1) can convert the analog output voltage to the calibrated output signal, $V_{OUT}$ also as used previously.

Calibration of gyroscope 150 can be performed using calibration system 40 (FIG. 2) and executing calibration process 110. The open loop response of gyroscope 150 is similar to the open loop response of gyroscope 72 (FIG. 3). In particular, open loop response of gyroscope 150 can be expressed as follows:

$$SENS_P = \frac{V_{OUT}}{\Omega} = 4\frac{C_{REF-D}}{C_{REF-S}}V_{AGC}\frac{\omega_D}{(\omega_S^2 - \omega_D^2)}\frac{\beta'}{\sqrt[3]{M}} \quad (24)$$

However, the equation for slope, M, is expressed as follows:

$$M = -\frac{2\varepsilon_0 A}{C_1 t g^3} \quad (25)$$

Again, $V_{AGC}$, $\beta'$, and $C_{REF-D}/C_{REF-S}$ are design parameters and sense resonant frequency, $\omega_S$, drive resonant frequency, $\omega_D$, and slope, M, are measured values. However, in this example, $\beta'$ is not purely a design dependent. Rather, $\beta'$ is additionally a function of both a width of a vertical sense gap 166, g, and a thickness 168, t, of movable masses 152 (see especially FIG. 7). Referring to equation (23), the mass of movable masses 152 depends upon −1 power of thickness 168, t, and −3 power of sense gap 166, g. Typical MEMS fabrication processes have similar fractional variation of vertical sense gap 166 and thickness 168 (approximately ten percent). Accordingly, execution of calibration process 110 can provide useful data for computing a gain value for gyroscope 150.

Thus, execution of calibration process 110 provides a technique in which a DC voltage bias between fixed drive electrodes and a movable mass is varied in order to observe changes in sense resonant frequency relative to the voltage bias. The sense resonant frequency versus voltage bias data can be used as an input in order to calculate gain of a MEMS inertial sensor, such as a vertical sense or a lateral sense gyroscope. Accordingly, a sensitivity of the inertial sensor can be calibrated, or trimmed, utilizing standard semiconductor test tools without subjecting the inertial sensor to an inertial stimulus thereby realizing significant savings in terms of equipment costs and test time.

The various equations are provided herein for illustrative purposes. In practice, however, the equations may differ due to different structures of the inertial sensors. Additionally, there may be deviations from the ideal that may call for the inclusion of scaling constants and/or other terms, not shown for simplicity of illustration.

It is to be understood that certain ones of the process blocks depicted in FIG. 4 may be performed in parallel with each other or with performing other processes. In addition, it is to be understood that the particular ordering of the process blocks depicted in FIG. 4 may be modified, while achieving substantially the same result. Accordingly, such modifications are intended to be included within the scope of the inventive subject matter. In addition, although a particular calibration system configuration is described in conjunction with FIG. 2, above, embodiments may be implemented in systems having other architectures, as well. These and other variations are intended to be included within the scope of the inventive subject matter.

While the principles of the inventive subject matter have been described above in connection with specific apparatus and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently so that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A method for calibrating an inertial sensor comprising:
    applying a bias voltage to said inertial sensor using a power source;
    measuring, at a frequency measurement subsystem, a sense resonant frequency of said inertial sensor produced in response to said bias voltage; and
    determining, at a gain determination subsystem, a gain value for calibrating said inertial sensor using said bias voltage and said sense resonant frequency.

2. A method as claimed in claim 1 wherein said frequency measurement subsystem is a first frequency measurement subsystem and said method further comprises measuring, at a second frequency measurement subsystem, a drive resonant frequency of said inertial sensor prior to applying said bias voltage, wherein said determining operation additionally utilizes said drive resonant frequency along with said sense resonant frequency and said bias voltage to determine said gain value.

3. A method as claimed in claim 2 further comprising inducing movement of a movable mass of said inertial sensor, wherein measurement of said drive resonant frequency occurs in response to said inducing operation.

4. A method as claimed in claim 2 wherein:
    said measuring said drive resonant frequency measures said drive resonant frequency along a first axis; and
    said measuring said sense resonant frequency measures said sense resonant frequency along a second axis, said second axis being perpendicular to said first axis.

5. A method as claimed in claim 1 wherein said applying operation comprises applying said bias voltage between a movable mass and a fixed electrode of said inertial sensor.

6. A method as claimed in claim 1 wherein said bias voltage comprises a direct current (DC) bias voltage.

7. A method as claimed in claim 1 wherein:
said applying operation applies said bias voltage at a plurality of voltage levels;
said measuring operation measures said sense resonant frequency for each of said plurality of voltage levels to produce a plurality of resonant frequency values; and
said determining operation includes utilizing a relationship between said resonant frequency values versus said plurality of voltage levels to obtain said gain value.

8. A method as claimed in claim 7 wherein said determining operation comprises:
measuring a slope of a plot of said plurality of resonant frequency values versus said plurality of voltage levels of said bias voltage;
ascertaining a first sensitivity of said inertial sensor using said slope; and
computing said gain value as a function of a design sensitivity of said inertial sensor relative to said first sensitivity.

9. A method as claimed in claim 8 wherein said frequency measurement system is a first frequency measurement system and said method further comprises measuring, at a second frequency measurement system, a drive resonant frequency of said inertial sensor prior to applying said bias voltage, wherein said ascertaining operation additionally utilizes said drive resonant frequency and said sense resonant frequency along with said slope to determine said sensitivity of said inertial sensor.

10. A method as claimed in claim 1 further comprising said gain determination subsystem storing said gain value in said inertial sensor.

11. A method as claimed in claim 1 wherein said applying and measuring steps are performed without imposing an inertial stimulus on said inertial sensor.

12. A system for calibrating an inertial sensor comprising:
a power source configured to apply a bias voltage to said inertial sensor;
a frequency measurement subsystem configured to measure a sense resonance frequency of said inertial sensor; and
gain determination subsystem configured to determine a gain value for calibrating said inertial sensor using said bias voltage and said sense resonant frequency.

13. A system as claimed in claim 12 wherein:
said frequency measurement subsystem is a first frequency measurement subsystem; said system further comprises a second frequency measurement subsystem configured to measure a drive resonant frequency of said inertial sensor; and
said gain determination subsystem is configured to utilize said drive resonant frequency along with said sense resonant frequency and said bias voltage to determine said gain value.

14. A system as claimed in claim 12 wherein:
said power source is configured to apply said bias voltage at a plurality of direct current (DC) voltage levels;
said frequency measurement subsystem is configured to measure said sense resonant frequency for each of said plurality of DC voltage levels to produce a plurality of resonant frequency values; and
said gain determination subsystem is configured to utilize a relationship between said resonant frequency values versus said plurality of DC voltage levels to obtain said gain value.

15. A system as claimed in claim 14 wherein said gain determination subsystem is configured to measure a slope of a plot of said plurality of resonant frequency values versus said plurality of DC voltage levels of said bias voltage, ascertain a first sensitivity of said inertial sensor using said slope, and compute said gain value as a function of a design sensitivity of said inertial sensor relative to said first sensitivity.

16. A system as claimed in claim 12 wherein said gain determination subsystem is configured to store said gain value in association with said inertial sensor.

17. A method for calibrating an inertial sensor comprising:
applying a bias voltage to said inertial sensor at a plurality of direct current (DC) voltage levels using a power source;
measuring, at a frequency measurement subsystem, a sense resonant frequency of said inertial sensor in response to said bias voltage by measuring said sense resonant frequency for each of said plurality of DC voltage levels to produce a plurality of resonant frequency values;
determining, at a gain determination subsystem, a gain value for calibrating said inertial sensor using said bias voltage and said sense resonant frequency, wherein said determining operation utilizes a relationship between said resonant frequency values versus said plurality of DC voltage levels to obtain said gain value; and
said gain determination subsystem storing said gain value in association with said inertial sensor.

18. A method as claimed in claim 17 wherein said frequency measurement subsystem is a first frequency measurement subsystem and said method further comprises measuring, at a second frequency measurement subsystem, a drive resonant frequency of said inertial sensor prior to applying said bias voltage, wherein said determining operation additionally utilizes said drive resonant frequency along with said relationship between said resonant frequency values versus said plurality of DC voltage levels to obtain said gain value.

19. A method as claimed in claim 17 wherein said determining operation comprises:
measuring a slope of a plot of said plurality of resonant frequency values versus said plurality of DC voltage levels of said bias voltage;
ascertaining an operational sensitivity of said inertial sensor using said slope; and
computing said gain value as a function of a design sensitivity of said inertial sensor relative to said operational sensitivity.

20. A method as claimed in claim 17 wherein said applying and measuring steps are performed without imposing an inertial stimulus on said inertial sensor.

* * * * *